Figure 6:
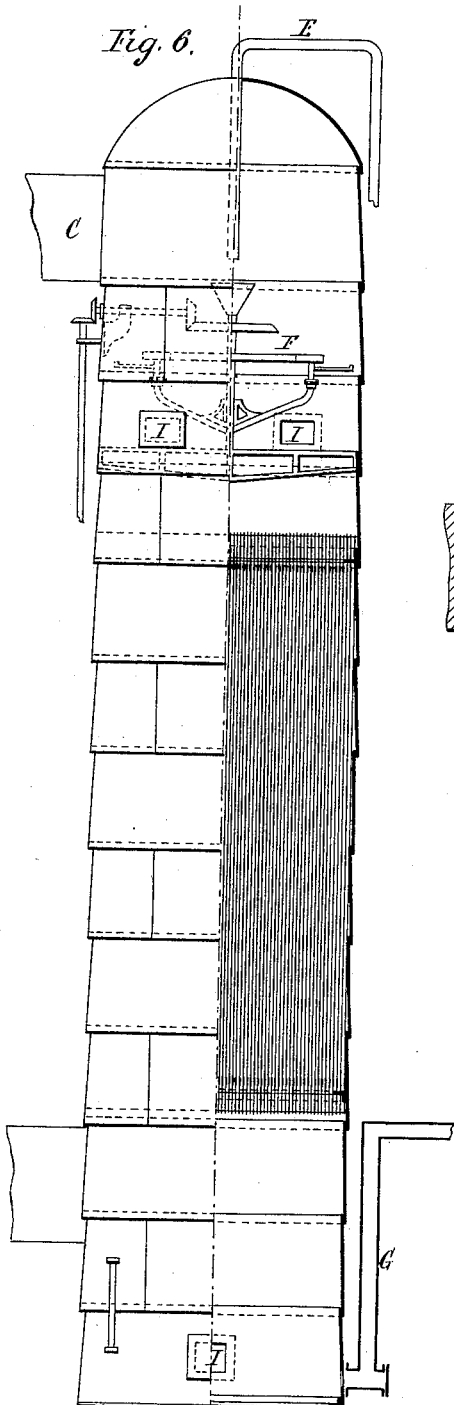

(No Model.) 3 Sheets—Sheet 1.
C. COCHRANE.
PROCESS OF DESICCATING THE AIR SUPPLY FOR FURNACES.
No. 341,316. Patented May 4, 1886.
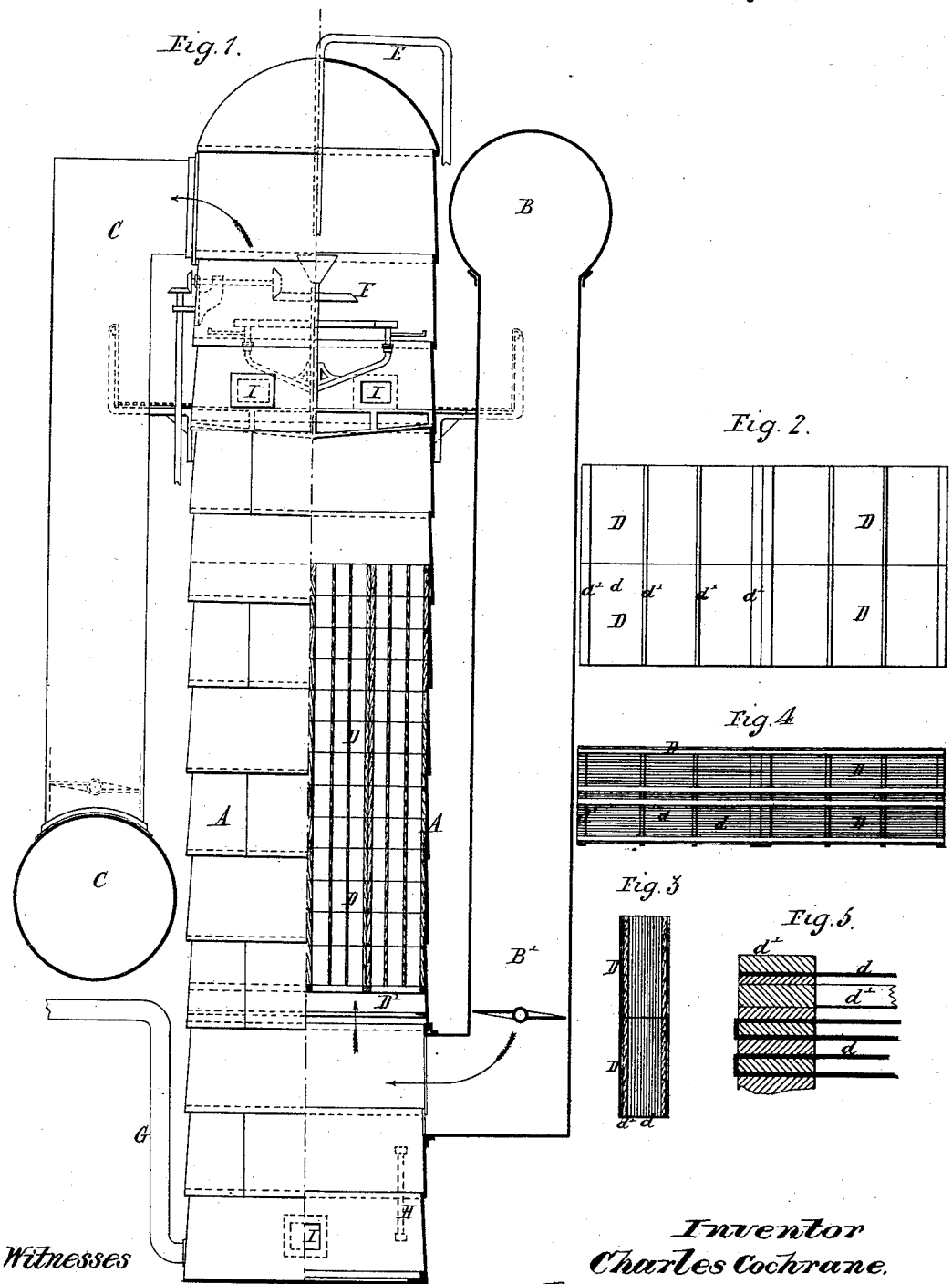
Witnesses
J. A. Rutherford
Robt. Everett
Inventor
Charles Cochrane,
By James L. Norris.
Atty.

(No Model.) 3 Sheets—Sheet 2.

C. COCHRANE.
PROCESS OF DESICCATING THE AIR SUPPLY FOR FURNACES.

No. 341,316. Patented May 4, 1886.

Witnesses.

Inventor.
Charles Cochrane.
By James L. Norris.
Atty.

(No Model.) 3 Sheets—Sheet 3.
C. COCHRANE.
PROCESS OF DESICCATING THE AIR SUPPLY FOR FURNACES.
No. 341,316. Patented May 4, 1886.
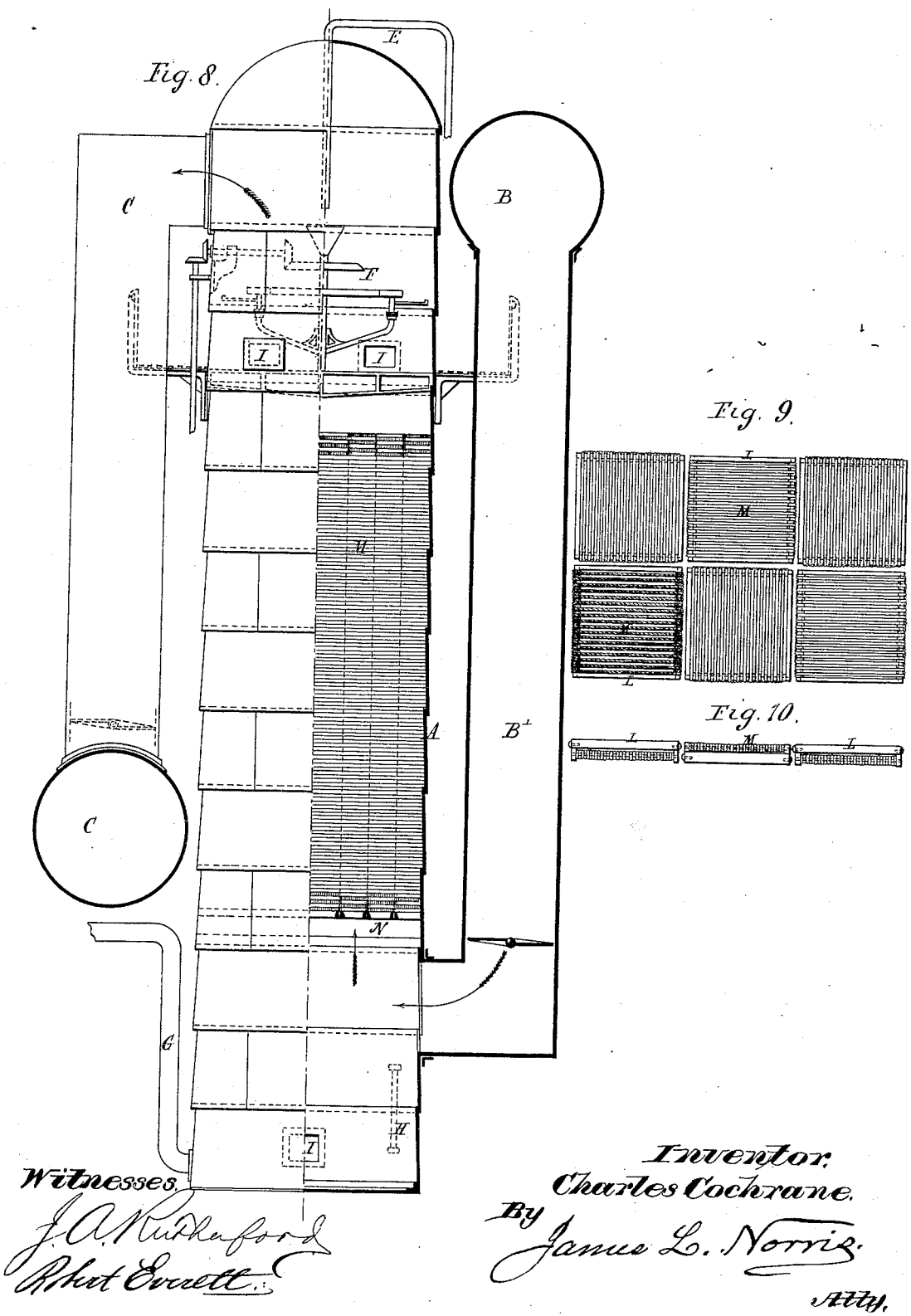
Witnesses
J. A. Rutherford
Robt Everett
Inventor
Charles Cochrane.
By James L. Norris.
Atty.
N. PETERS. Photo-Lithographer, Washington, D. C.

UNITED STATES PATENT OFFICE.

CHARLES COCHRANE, OF STOURBRIDGE, COUNTY OF WORCESTER, ENGLAND.

PROCESS OF DESICCATING THE AIR-SUPPLY FOR FURNACES.

SPECIFICATION forming part of Letters Patent No. 341,316, dated May 4, 1886.

Application filed May 25, 1885. Serial No. 166,630. (No model.) Patented in England January 2, 1885, No. 94; in France May 20, 1885, No. 169,048, and in Belgium May 22, 1885, No. 68,963.

*To all whom it may concern:*

Be it known that I, CHARLES COCHRANE, a citizen of England, residing at Stourbridge, in the county of Worcester, England, have invented a new and useful Process of Desiccating the Air-Supply to Furnaces, of which the following is a specification.

My invention relates to an improved method of effecting the desiccation of the air-supply for blast-furnaces and other similar purposes. It has heretofore been proposed to effect such desiccation by passing the air through towers or chambers containing either solid calcium chloride, quicklime, or sulphuric acid, whereby the moisture is absorbed from the air. According to my present invention, I employ in place of these substances a concentrated solution of calcium chloride, which is caused to flow in thin strata over very extended surfaces in an inclosed chamber, through which the air-blast to be desiccated is caused to pass, so as to be brought into intimate contact in a very subdivided state with the calcium chloride. The calcium-chloride solution in taking up the moisture from the air becomes more and more diluted, and when a certain degree of dilution is reached it is made to pass out of the chamber, and after being brought back to the original degree of concentration it is again introduced into the desiccating-chamber. The advantages arising from the use of such concentrated solution of calcium chloride in place of the other substances above named are very great, as I will proceed to explain. Referring in the first place to the use of solid calcium chloride, this presents the following disadvantages:

First. The solid material, being necessarily introduced in lumps varying in size into the desiccating-chamber, the interstices between them will necessarily also vary greatly in size, and consequently, while some particles of air in passing through small interstices, may be brought very intimately in contact with the calcium chloride, other particles in passing through large interstices will only be very imperfectly acted upon, so that the desiccating action is imperfect and unreliable. On the other hand, in using a concentrated solution in place of the solid material, the former can be distributed in a very uniform manner over extended surfaces—such as I will presently describe—so arranged that the air is also caused to pass in a very uniform manner and in thin strata in contact with the solution, thus insuring that every particle thereof shall be perfectly acted upon.

Second. Owing to the rough irregular nature of the surfaces of the pieces of calcium chloride, the layers thereof offer great resistance to the passage through them of the air-blast, resulting in the employment of considerably-increased power to force the air through the desiccating-chamber at the required velocity, and the loss of power resulting from this frequently increases to an enormous extent, owing to the fact that the calcium chloride on the surfaces of the lumps becomes liquefied in taking up the moisture from the air, and then in filling up the small interstices between the lumps often actually blocks the passage of the air altogether. On the other hand, in using regularly-arranged surfaces over which liquid calcium chloride flows, there is comparatively little resistance offered to the passage of the air-blast, and there is no danger of choking.

Third. In using solid calcium chloride, this, in absorbing moisture from the air, gradually becomes converted into the liquid condition from which it has to be reconverted into the solid condition by a process of evaporation and boiling, necessitating a great expenditure of fuel and large plant, inasmuch as the consumption of fuel required in evaporating or boiling the material, so as to drive off the last portions of moisture from the concentrated solution, is greatly in excess of that required for an equal evaporation at the less concentrated stages, in addition to which the dry material has to be maintained in a state of fusion, in order to run it off into cooling-tanks, where, after solidification, it has to be broken up into pieces, loaded into trucks, hoisted to the top of the desiccating-chamber, and charged at intervals by manual labor through air-locks into the chamber, and when stored it requires to be carefully inclosed to prevent absorption of moisture from the atmosphere.

It will be evident that all these operations involve a large expenditure for plant, labor, and fuel, which is practically avoided by the use of the concentrated solution, inasmuch as with this the only plant and operation required are a comparatively small evaporating-tank for bringing the dilute solution back to the concentrated stage, and a pump for conveying the concentrated solution to the top of the desiccating-chamber and feeding it into the same, this operation being carried on in a continuous manner, instead of the necessarily intermittent operation with the solid material. It is of course obvious that the solid calcium chloride, having greater avidity for moisture than the concentrated solution in the same proportion as it contains less moisture, will be somewhat more effective in absorbing the moisture of the air-blast at starting; but this comparatively small advantage is greatly overbalanced by the above-mentioned greatly-increased expenditure of fuel in bringing the material from the concentrated stage to the solid condition, irrespective of the additional cost of plant and labor, above alluded to. With regard to the use of sulphuric acid, it will be seen at the first glance that this would entail such increased expenditure as to be out of all comparison with the calcium-chloride solution. In the first place the material itself is much more expensive. In the second place the desiccating-chamber surfaces over which it flows must be of an expensive material—such as lead—that will not be attacked by the acid, instead of wood, canvas, or iron used with the solution; and, lastly, the manipulation of the material and the evaporation of the water therefrom is so difficult and attended with such danger as to alone prohibit its application. With regard to quicklime, the disadvantages of this material are also so obvious as to hardly need pointing out. It is, comparatively, so slow in taking up moisture from air that it would require an enormous bulk to act efficiently upon the air-supply to a blast-furnace, and forcing the air through such a mass of material an enormous loss of power would ensue. Furthermore, the lime in taking up moisture swells and becomes pulverulent and pasty, and thus will eventually entirely block the passage of air through. Added to this is the enormous cost of reburning the large mass of slaked lime.

Having thus pointed out the very great advantages in using concentrated solution of calcium chloride as compared with the above-mentioned materials heretofore proposed, I will now proceed to describe the means which I have found to answer best in applying the same, referring for this purpose to the accompanying drawings, in which—

Figures 1 to 10 show different modifications of the apparatus for treating the air with liquid calcium chloride.

Fig. 1 shows a part elevation and part vertical section of one arrangement. A is a vertical air-tight casing of circular cross-section, into the lower part of which the air to be desiccated is introduced through the branch pipe B' from the main pipe B, while the dried air issues therefrom at the top through the pipe C. Within the casing A are arranged a number of frames, D D, containing stretched sheets of canvas or other suitable fabric, d d, arranged in vertical positions closely side by side between wood laths d', as shown more clearly in the enlarged elevation, cross-section and plan thereof at Figs. 2, 3, and 4, and in the still farther enlarged detail at Fig. 5. These frames, being supported at bottom by beams D' and arranged side by side and one above the other, as shown, offer very extended surfaces, over which the concentrated calcium-chloride solution is made to flow downward, this being supplied through a pipe, E, to any suitable arrangement of distributing apparatus, F, by which the liquid is distributed uniformly over all the frames at top. Thus the air in passing up from the pipe B' through the narrow spaces between the canvas sheets is brought into very intimate contact with the calcium-chloride solution flowing down them; and it will be seen that the air entering from B', containing the full amount of moisture, will be brought in contact with the chloride of calcium flowing down the lowermost frames, which has already taken up a large amount of moisture, while in passing upward the air will become more and more deprived of its moisture, until near the top it is brought in contact with the fresh calcium chloride, so that by this well-known action of reversed currents the air will be very effectually deprived of its moisture with a minimum expenditure of calcium chloride. The calcium-chloride solution, in a more or less dilute condition consequent upon the moisture which it has taken up, collects in the bottom of the casing A, and is discharged thence by the pressure of the blast acting upon the surface of the liquid, through the pipe G, or it may be withdrawn by a pump, in order to be evaporated down to the requisite concentrated condition for being used over again in the apparatus. H is a glass gage for observing the height of the solution in the casing. I I are man-holes for gaining access to the interior thereof.

Figure 7:
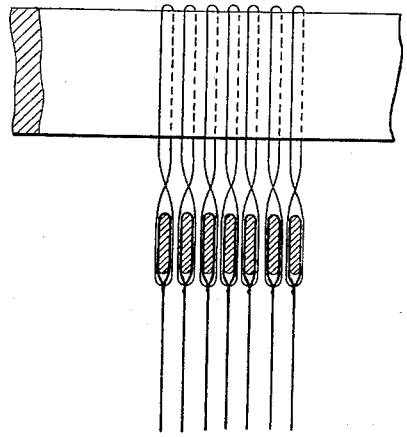

In the modified arrangement shown at Fig. 6, the canvas surfaces J J, instead of being stretched in small frames piled one above the other, as in the above-described arrangement, are formed as continuous sheets extending from top to bottom, being attached to stiffening-laths K, which are secured by ropes to beams K', fixed on the casing A, as shown more clearly at the enlarged detail, Fig. 7. The apparatus is otherwise of the same construction as above described.

Fig. 8 shows another mode of forming extended surfaces for the calcium-chloride solution to flow over. In this case wooden rectangular frames L L, wound round with rope M, are supported at bottom by beams N, and are arranged closely side by side and one above the other, being made to alternate in position, as shown more clearly in the enlarged plan and side view at Figs. 9 and 10. The alternation of the position of the frames may be variously modified, and it might indeed almost be dispensed with. The rope is so wound upon the frames as to leave a small space between each successive winding, thus forming narrow passages for the air-blast to pass up through, while the calcium-chloride solution supplied from the distributing apparatus F drips down from the ropes of one frame to those of the next below.

Having thus described the nature of my invention, and the best means I know for carrying the same into practical effect, I claim—

The method of drying air which consists in bringing the air into contact with a concentrated solution of calcium chloride flowing through a suitable casing or chamber, while the air is passing through said chamber in the opposite direction, the resulting dilute calcium-chloride solution being again evaporated down to the concentrated condition, in order to be again charged into the chamber, substantially as herein described.

In testimony whereof I have signed my name to this specification, in the presence of two subscribing witnesses, this 7th day of May, A. D. 1885.

CHARLES COCHRANE.

Witnesses:
CHARLES D. ABEL,
JNO. P. M. MILLARD.